US00RE48990E

(19) United States
(12) Reissued Patent
Tanaka

(10) Patent Number: US RE48,990 E
(45) Date of Reissued Patent: Mar. 29, 2022

(54) LIQUID EJECTION APPARATUS AND METHOD OF FORMING LIQUID EJECTION APPARATUS

(71) Applicant: BROTHER KOGYO KABUSHIKI KAISHA, Nagoya (JP)

(72) Inventor: Taiki Tanaka, Nagoya (JP)

(73) Assignee: BROTHER KOGYO KABUSHIKI KAISHA, Nagoya (JP)

(21) Appl. No.: 16/444,009

(22) Filed: Jun. 18, 2019

Related U.S. Patent Documents

Reissue of:

(64) Patent No.: 9,682,558
Issued: Jun. 20, 2017
Appl. No.: 14/969,701
Filed: Dec. 15, 2015

(30) Foreign Application Priority Data

Dec. 26, 2014 (JP) ..... 2014-264177

(51) Int. Cl.
*B41J 2/14* (2006.01)
*B41J 2/16* (2006.01)

(52) U.S. Cl.
CPC ..... *B41J 2/14233* (2013.01); *B41J 2/161* (2013.01); *B41J 2/1623* (2013.01); *B41J 2/1628* (2013.01);

(Continued)

(58) Field of Classification Search
None
See application file for complete search history.

(56) References Cited

U.S. PATENT DOCUMENTS 6,450,617 B1 * 9/2002 Kitani ..... B41J 2/14072 347/50
9,356,222 B2 * 5/2016 Sakai ..... H01L 41/053
(Continued)

FOREIGN PATENT DOCUMENTS

CN 1346828 A2 9/2003
CN 101388432 A 3/2009
(Continued)

OTHER PUBLICATIONS

Machine Translation of JP 2013-247221 (annotated) , Clarivate Analytics, 2021, 7 pages. (Year: 2021).*
(Continued)

*Primary Examiner* — Sean E Vincent
(74) *Attorney, Agent, or Firm* — Merchant & Gould P.C.

(57) ABSTRACT

A liquid ejection apparatus and method of manufacture are disclosed. One apparatus includes a pressure chamber, a diaphragm covering the pressure chamber, and a piezoelectric element having a piezoelectric component positioned opposing the pressure chamber. The apparatus further includes a first electrode disposed on a first side of the piezoelectric component toward the pressure chamber and a second electrode disposed on a second side of the piezoelectric component opposite the first side in an opposed region, the opposed region being a region opposed to the second electrode. The apparatus also includes a metal film disposed between the piezoelectric component and the diaphragm, the metal film being absent from at least a portion of the opposed region. The metal film and the first electrode are in electrical contact with each other. The first electrode is made of platinum and the metal film is made of a metal material other than platinum.

15 Claims, 14 Drawing Sheets

(52) U.S. Cl.
CPC .... *B41J 2/1646* (2013.01); *B41J 2002/14266* (2013.01); *B41J 2002/14491* (2013.01)

(56) References Cited

U.S. PATENT DOCUMENTS

| | | | |
|---|---|---|---|
| 2009/0066763 | A1 | 3/2009 | Fujii et al. |
| 2009/0309936 | A1 | 12/2009 | Mita |
| 2014/0240398 | A1 | 8/2014 | Yamashita |
| 2015/0085023 | A1 | 3/2015 | Sakai |

FOREIGN PATENT DOCUMENTS

| | | | |
|---|---|---|---|
| CN | 104002558 | A | 8/2014 |
| EP | 1346828 | A2 | 9/2003 |
| JP | 2000-006398 | A | 1/2000 |
| JP | 4811598 | B2 | 11/2011 |
| JP | 2013-247221 | A | 12/2013 |
| JP | 2016-27593 | A | 2/2016 |

OTHER PUBLICATIONS

Notice of Reasons for Refusal issued in related Japanese Patent Application No. 2014-264177, dated Jul. 25, 2019.
First Office Action from corresponding Chinese Patent Application No. 201511001068.2, dated Dec. 13, 2016, 20 pages.

* cited by examiner

LIQUID EJECTION APPARATUS AND METHOD OF FORMING LIQUID EJECTION APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[This] *The present* application *is a reissue of U.S. Pat. No. 9,682,558, which further* claims priority from Japanese Patent Application No. 2014-264177 filed on Dec. 26, 2014, *both of* which [is] *are* incorporated herein by reference in [its] *their* entirety.

BACKGROUND

1. Technical Field

The present disclosure relates to a liquid ejection apparatus.

2. Description of the Related Art

Japanese Patent No. 4811598 discloses an inkjet head as a liquid ejection apparatus. The inkjet head includes piezoelectric elements for ejection of a liquid. The inkjet head includes a channel defining substrate, which has a plurality of pressure chambers, and piezoelectric elements disposed for the corresponding pressure chambers of the channel defining substrate. The piezoelectric elements each include a piezoelectric film, a lower electrode film disposed below the piezoelectric film, and an upper electrode film disposed above the piezoelectric film. The lower electrode film is a common electrode for the piezoelectric elements. The upper electrode film is an individual electrode and is disposed for each of the piezoelectric elements. The lower electrode film includes a conductor layer mainly composed of platinum.

SUMMARY

The thickness of the electrode is desired to be as thin as possible to reduce the cost if the electrode disposed below the piezoelectric film is made of platinum, which is expensive. In addition, the electrode having a large thickness may inhibit deformation of the piezoelectric film. However, reduction in the thickness of the electrode to overcome these problems increases the electrical resistance of the electrode, which adversely affects the behaviors (such as responsiveness) of the piezoelectric elements.

It is an object of the present disclosure to reduce the thickness of the electrode made of platinum to achieve a low cost and to reduce the substantial electrical resistance of the electrode.

According to an aspect of the disclosure, a liquid ejection apparatus includes a pressure chamber; a diaphragm covering the pressure chamber; a piezoelectric element having a piezoelectric component positioned opposing the pressure chamber; a first electrode disposed on a first side of the piezoelectric component toward the pressure chamber; a second electrode disposed on a second side of the piezoelectric component opposite the first side in an opposed region, the opposed region being a region opposed to the second electrode; and a metal film disposed between the piezoelectric component and the diaphragm, the metal film being absent from at least a portion of the opposed region. The metal film and the first electrode are in electrical contact with each other. The first electrode is made of platinum and the metal film is made of a metal material other than platinum.

According to a further aspect of the disclosure, a method of forming a liquid ejection apparatus is disclosed. The method includes forming a diaphragm layer on a surface of a substrate; forming a metal film in a first region; and forming a first electrode in the first region and in a second region, the first electrode layer being made of platinum and electrically contacting the metal film. The method also includes forming a piezoelectric layer over the first electrode layer; and forming a second electrode over the piezoelectric layer in the second region. The metal film is absent from at least a portion of the second region, and is made of a metal material other than platinum.

DESCRIPTION OF THE PREFERRED EMBODIMENTS

Figure 1:
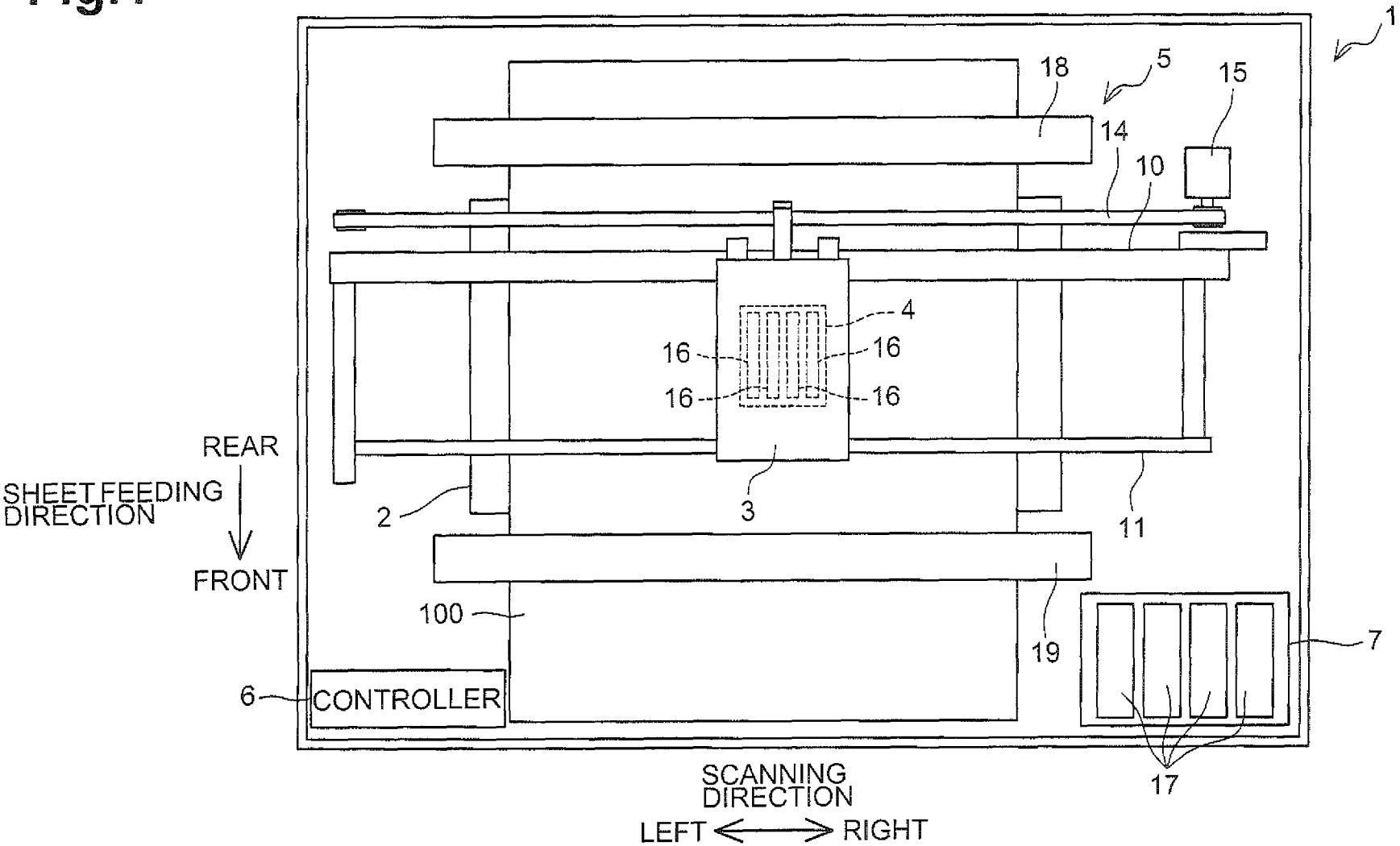
FIG. 1 is a schematic plan view illustrating a printer according to an embodiment.

An embodiment of the present disclosure is described below. FIG. 1 is a schematic plan view illustrating a printer in the embodiment. An overall configuration of an inkjet printer 1 is described with reference to FIG. 1. In this specification, front, rear, left, and right sides in FIG. 1 are defined as front, rear, left, and right sides of a printer. A side facing the viewer is defined as an upper side and a side away from the viewer is defined as a lower side. Hereinafter, terms such as front, rear, left, right, upper, and lower sides are suitably used to describe the embodiment.

Overall Configuration of Printer

As illustrated in FIG. 1, the inkjet printer 1 includes a platen 2, a carriage 3, an inkjet head 4, a transport mechanism 5, a controller 6, and other components.

A recording sheet 100 as a recording medium is placed on an upper surface of the platen 2. The carriage 3 is configured to be reciprocated in a left-right direction, which may be referred to as a scanning direction hereinafter, along two guide rails 10 and 11 in an area facing the platen 2. An endless belt 14 connected to the carriage 3 is rotated by a carriage drive motor 15 to move the carriage 3 in the scanning direction.

The inkjet head 4 is mounted on the carriage 3 so as to be moved in the scanning direction together with the carriage 3. The inkjet head 4 includes four head units 16 arranged in the scanning direction. The head units 16 are each connected, through a tube (not illustrated), to a cartridge holder 7 that holds ink cartridges 17 of four colors (black, yellow, cyan, and magenta). Each head unit 16 includes a plurality of nozzles 24 (see FIG. 2 to FIG. 4) at a lower surface thereof (surface at the side facing away from the viewer in FIG. 1). The nozzles 24 of each head unit 16 eject ink supplied from the ink cartridge 17 to the recording sheet 100 on the platen 2.

The transport mechanism 5 includes two transport rollers 18 and 19 disposed in the front-rear direction with the platen 2 being disposed therebetween. The transport mechanism 5 transports the recording sheet 100 on the platen 2 to the front (in a transport direction) by the transport rollers 18 and 19.

The controller 6 includes a Read Only Memory (ROM), a Random Access Memory (RAM), and an Application Specific Integrated Circuit (ASIC) including various control circuits, for example. The controller 6 directs the ASIC to execute various operations such as a printing operation on the recording medium 100 in accordance with a program in the ROM. In the printing operation, for example, the controller 6 controls the inkjet head 4, the carriage drive motor 15, and other components to print an image on the recording medium 100 based on a printing instruction input by an external device such as a PC. Specifically, the printing is performed by alternately repeating an ink ejection operation in which the inkjet head 4 ejects the ink while being moved in the scanning direction together with the carriage 3 and a transport operation in which the transport rollers 18 and 19 transport the recording sheet 100 a predetermined distance in the transport direction.

Detailed Description of Inkjet Head

Figure 2:
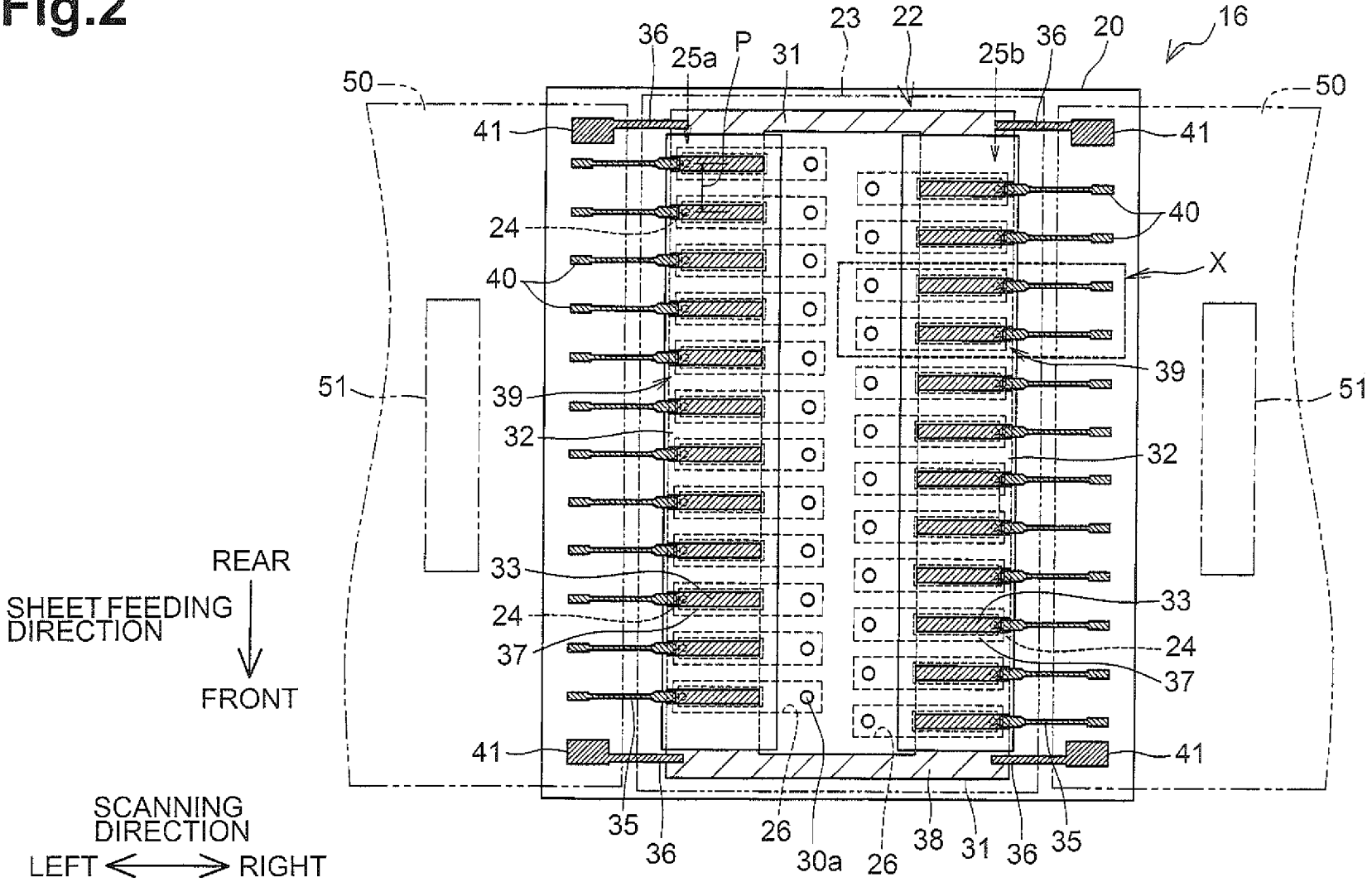
FIG. 2 is a top view of one of head units of an inkjet head.
Figure 3:
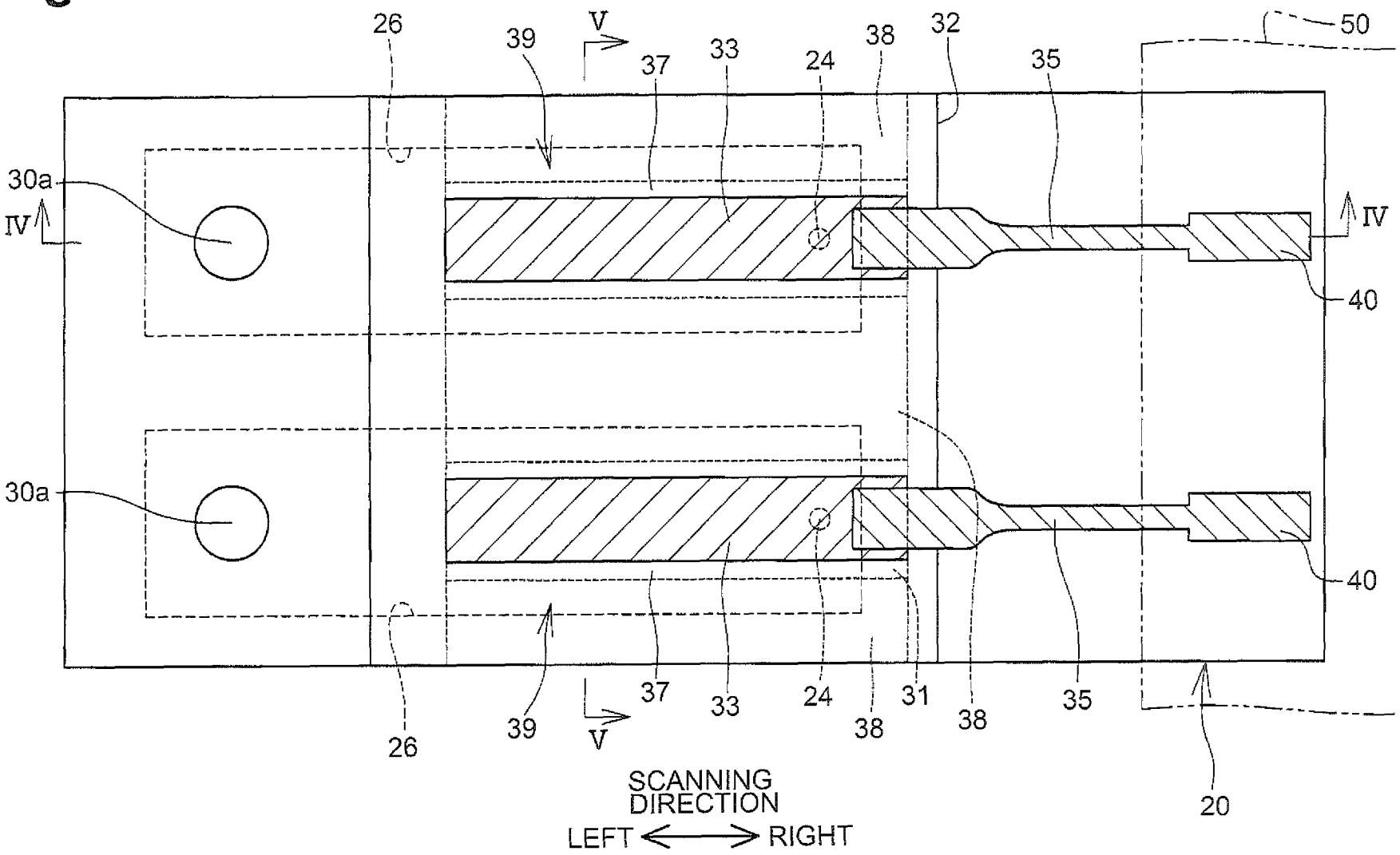
FIG. 3 is a magnified view of a section indicated by X in FIG. 2.
Figure 4:
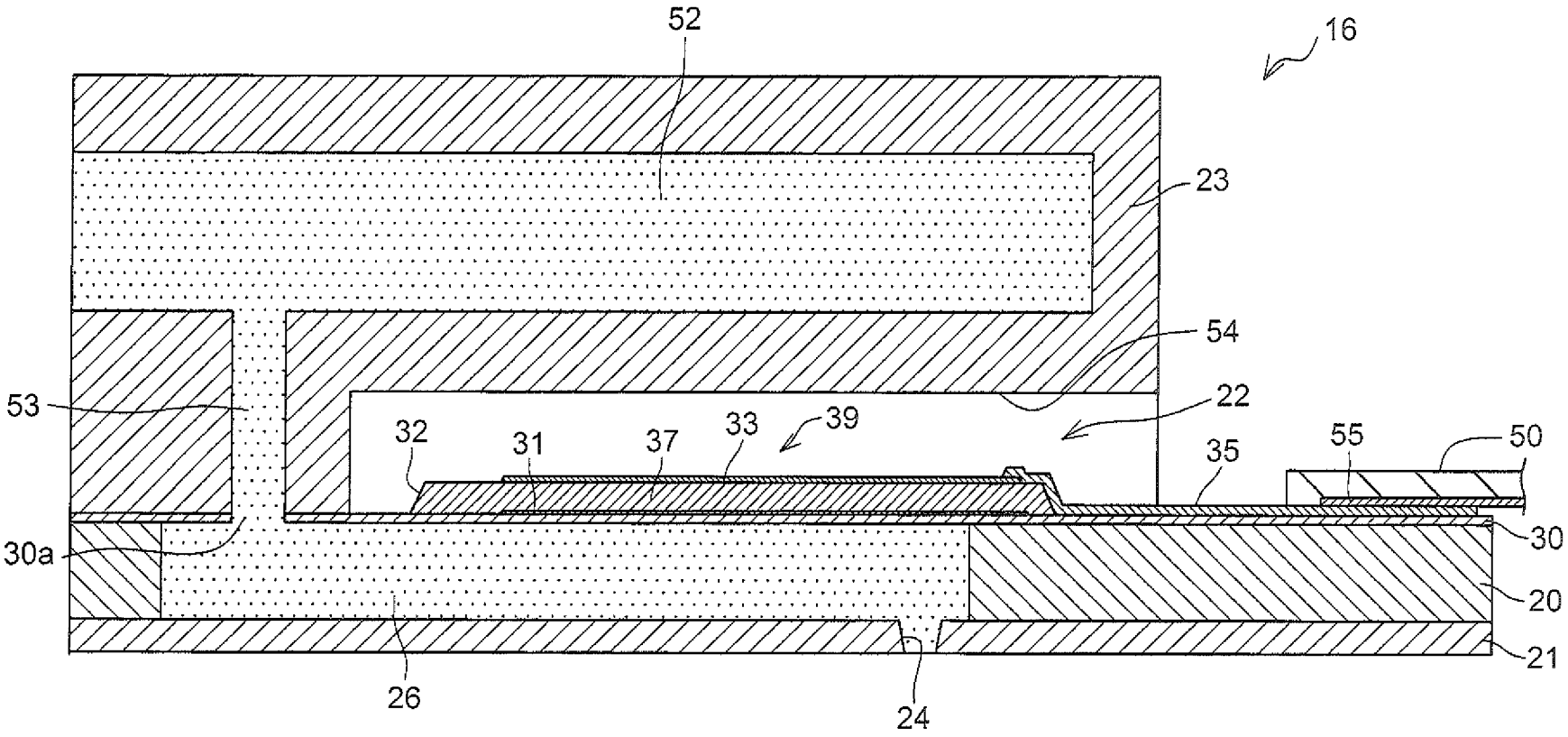
FIG. 4 is a cross-sectional view taken along a line IV-IV in FIG. 3.
Figure 5:
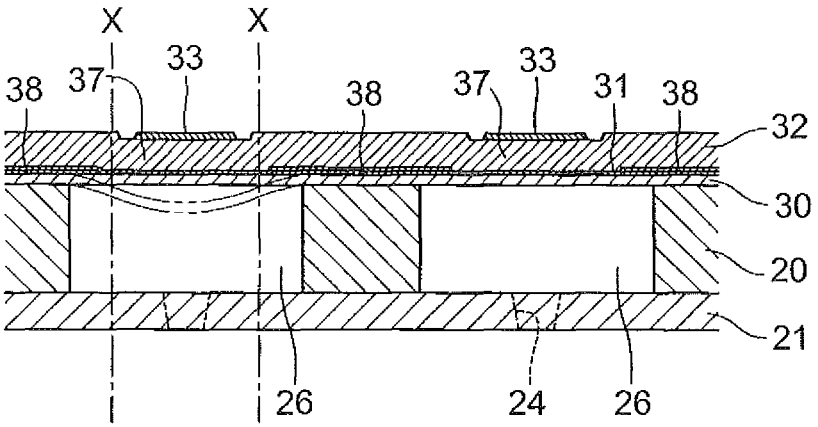
FIG. 5 is a cross-sectional view taken along a line V-V in FIG. 3.

The inkjet head 4 is described in detail. FIG. 2 is a top view of one of head units 16 of the inkjet head 4. The inkjet head 4 includes four identical head units 16. The configuration of one of the head units 16 is described and description of the other head units 16 is omitted. FIG. 3 is a magnified view of a section indicated by X in FIG. 2. FIG. 4 is a cross-sectional view taken along a line IV-IV in FIG. 3. FIG. 5 is a cross-sectional view taken along a line V-V in FIG. 3.

As illustrated in FIG. 2 to FIG. 5, the head unit 16 includes a channel substrate 20, a nozzle plate 21, a piezoelectric actuator 22, and a reservoir defining member 23. In FIG. 2, the reservoir defining member 23, which is positioned above the channel substrate 20 and the piezoelectric actuator 22, is outlined by a two-dotted chain line to simplify the figure. In addition, a COF 50, which is illustrated by a solid line in FIG. 4, is indicated by a two-dotted chain line in FIG. 2 and FIG. 3.

Channel Substrate

The channel substrate 20 is a monocrystalline silicon substrate. The channel substrate 20 includes a plurality of pressure chambers 26. As illustrated in FIG. 2 and FIG. 3, the pressure chambers 26 each have a rectangular shape elongated in the scanning direction in plan view. The pressure chambers 26 are arranged in the transport direction so as to form two pressure chamber rows arranged side by side in the scanning direction. The channel substrate 20 further includes a diaphragm 30 that covers the pressure chambers 26. The diaphragm 30 is a silicon dioxide ($SiO_2$) film or a silicon nitride (SiNx) film that is obtained by partially oxidizing or nitriding the channel substrate 20 made of silicon. The diaphragm 30 has a plurality of communication holes 30a to allow a channel in the reservoir defining member 23, which is described later, and the pressure chambers 26 to be in communication with each other.

Nozzle Plate

The nozzle plate 21 is bonded to a lower surface of the channel substrate 20. The nozzle plate 21 includes a plurality of nozzles 24 that are in communication with the pressure chambers 26 of the channel substrate 20. As illustrated in FIG. 2, the nozzles 24 are arranged in the transport direction so as to form two nozzle rows 25a and 25b arranged side by side in the scanning direction as the pressure chambers 26. Each nozzle 24 in the nozzle row 25a is offset from the corresponding nozzle 24 in the nozzle row 25b in the transportation direction by a half of a pitch P (P/2) of the nozzle rows 25a and 25b. A material of the nozzle plate 21 is not particularly limited. The nozzle plate 21 may be made of a metal material such as stainless steel, silicon, or a synthetic resin material such as polyimide.

Piezoelectric Actuator

The piezoelectric actuator 22 is configured to apply ejection energy to the ink in the pressure chambers 26 so as to allow the ink to be ejected through the nozzles 24. The piezoelectric actuator 22 is disposed on an upper surface of the diaphragm 30 of the channel substrate 20. As illustrated in FIG. 2 to FIG. 4, the piezoelectric actuator 22 on the upper surface of the diaphragm 30 includes a plurality of piezoelectric elements 39 disposed so as to correspond to the pressure chambers 26, which are arranged in two rows, and a plurality of traces 35 corresponding to the piezoelectric elements 39, for example.

Hereinafter, the piezoelectric elements 39 of the piezoelectric actuator 22 and other associated components are sequentially described. Each piezoelectric element 39 includes a piezoelectric portion 37, a lower electrode 31 disposed on a lower surface (surface adjacent to the diaphragm 30) of the piezoelectric portion 37, and an upper electrode 33 disposed on an upper surface (surface remote from the diaphragm 30) of the piezoelectric portion 37.

The lower electrode 31 is disposed on an upper surface of the diaphragm 30 so as to be positioned over the pressure chambers 26 corresponding to the piezoelectric elements 39. Specifically, as illustrated in FIG. 2 and FIG. 6, the lower electrode 31 includes two first electrode sections 31a extending in the transport direction along with the two pressure chamber rows and two second electrodes 31b each connecting corresponding ends in the transport direction of the first electrode sections 31a to form a rectangular frame shape in plan view. The lower electrode 31 is a common electrode for the piezoelectric elements 39. In other words, electrode sections of the lower electrode 31 facing the pressure chambers 26 are electrically connected and integrated. The lower electrode 31 is made of platinum (Pt).

In this embodiment, as illustrated in FIG. 5, a metal film 38 that is made of a material other than platinum is stacked on the lower electrode 31. The metal film 38 is positioned below the lower electrode 31, i.e., between the lower electrode 31 and the diaphragm 30. The metal film 38 is described in detail later.

As illustrated in FIG. 2, two piezoelectric components 32 each extending in the transport direction are disposed above the lower electrode 31 so as to correspond to the two pressure chamber rows. As illustrated in FIG. 4, the piezoelectric components 32 each have left and right sides that are inclined inwardly with respect to a plane perpendicular to the diaphragm 30. The piezoelectric components 32 each have a trapezoidal cross-sectional shape having an upper surface wider than a lower surface.

The piezoelectric components 32 each have a rectangular shape elongated in the transport direction in plan view. Each piezoelectric component 32 has drive portions, which apply pressures to the pressure chambers 26, at positions facing the pressure chambers 26. The drive portions are referred to as piezoelectric portions 37. In other words, the piezoelectric portions 37 arranged in the transport direction are connected to constitute one piezoelectric component 32. Each piezoelectric component 32 is stacked on the lower electrode 31 so as to extend across the pressure chambers 26 in one of the pressure chamber rows. The lower electrode 31 is disposed on the lower surface (adjacent to the diaphragm 30) of the piezoelectric component 32. Each piezoelectric component 32 is made of a piezoelectric material including lead zirconate titanate (PZT) as a main component, for example. The lead zirconate titanate is a mixed crystal including lead titanate and lead zirconate. Alternatively, the piezoelectric component 32 may be made of a lead-free piezoelectric material.

The upper electrodes 33 are disposed on the upper surfaces of the piezoelectric components 32 in the regions opposed to the pressure chambers 26. The upper electrodes 33 are individual electrodes and are disposed on the corresponding piezoelectric elements 39. The shape of each upper electrode 33 is not particularly limited, but may be a rectangular shape that is smaller than the pressure chamber 26 in plan view as illustrated in FIG. 3. The upper electrodes 33 are made of iridium (Ir), for example.

The piezoelectric portions 37 sandwiched between the lower electrode 31 and the upper electrodes 33 are polarized in the thickness direction toward a lower side, i.e., from the upper electrodes 33 to the lower electrode 31.

As illustrated in FIG. 2 to FIG. 4, the traces 35 are each connected to the upper electrodes 33 of the piezoelectric elements 39 at one end. Each trace 35 extends from the upper electrode 33 along the inclined surface of the piezoelectric component 32 to an upper surface of the diaphragm 30. The material of the trace 35 is not particularly limited, and may be gold (Au) or aluminum (Al).

The trace 35 extends from the corresponding piezoelectric element 39 in the scanning direction parallel to the surface of the diaphragm 30. Specifically, as illustrated in FIG. 2, the traces 35 extend from the piezoelectric elements 39 on the left toward the left and the traces 35 extend from the piezoelectric elements 39 on the right toward the right. Each trace 35 includes a driving contact 40 at the other end remote from the piezoelectric element 39. The driving contacts 40 of the traces 35 are arranged in the transport direction on left and right end sections of the channel substrate 20 (diaphragm 30).

Four traces 36 including two left and two right traces 36 are connected to the lower electrode 31. The two left traces 36 and the two right traces 36 extend from the lower electrode 31 to the left and to the right, respectively. One end of each trace 36 includes a ground contact 41. The ground contacts 41 and the driving contacts 40 form one line on each of the left and right end sections of the channel substrate 20 (diaphragm 30).

As illustrated in FIG. 2 to FIG. 4, two COFs 50 are connected to the respective left and right end sections of the diaphragm 30 of the channel substrate 20. Traces 55 of the COFs 50 are electrically connected to the driving contacts 40. Although not illustrated, the COFs 50 are also connected to the controller 6 (see FIG. 1).

A driver IC 51 is mounted on each COF 50. The driver IC 51 generates and outputs driving signals for driving the piezoelectric actuator 22 based on a control signal from the controller 6. The driving signals output by the driver IC 51 are received by the driving contacts 40 through the traces 55 of the COF 50 and supplied to the upper electrodes 33 through the traces 35 of the piezoelectric actuator 22. The upper electrodes 33 that have received the driving signals change in potential from the ground potential to a predetermined potential. The COF 50 further has ground traces (not illustrated) that are electrically connected to the ground contact 41 of the piezoelectric actuator 22. This configuration enables the potential of the lower electrode 31 connected to the ground contact 41 to be maintained at the ground potential.

The piezoelectric actuator 22 that has received the driving signal from the driver IC 51 operates as follows. Before the reception of the driving signal, the potential of each of the upper electrodes 33 is a ground potential, which is the same potential as the lower electrode 31. When the upper electrode 33 in such a state receives the driving signal, the potential thereof is changed to the driving potential. A potential difference between the upper electrode 33 and the lower electrode 31 generates parallel electric fields extending in the thickness direction of the piezoelectric portion 37. Since the direction of polarization of the piezoelectric portion 37 and the direction of the electric field are equal, the piezoelectric portion 37 elongates in the thickness direction, which is the direction of the polarization, and contracts in the planar direction. Due to such contraction deformation of the piezoelectric portion 37, the diaphragm 30 protrudes toward the pressure chamber 26. With this configuration, the volume of the pressure chamber 26 is reduced and a pressure wave is generated in the pressure chamber 26, which allows ink droplets to be ejected through the nozzle 24 in communication with the pressure chamber 26.

In this embodiment, the lower electrode 31 as the common electrode is made of platinum, which is expensive. The thickness of the lower electrode 31 is desired to be as small as possible to reduce cost. In addition, the deformation of the piezoelectric portion 37 is more likely to be inhibited as the thickness of the lower electrode 31 increases, and thus the lower electrode 31 is desired to have a small thickness. However, the reduction in the thickness of the lower electrode 31 increases the electrical resistance of the common electrode, which adversely affects the behavior of each piezoelectric element 39. The amount of the voltage drop between the ground contact 41 and the lower electrode 31 differs depending on the distance between the ground contact 41 and the piezoelectric element 39, for example. In the piezoelectric element 39 remote from the ground contact 41, the potential of the lower electrode 31 is likely to vary and become unstable, which adversely affects ejection properties such as responsiveness.

Figure 6A:
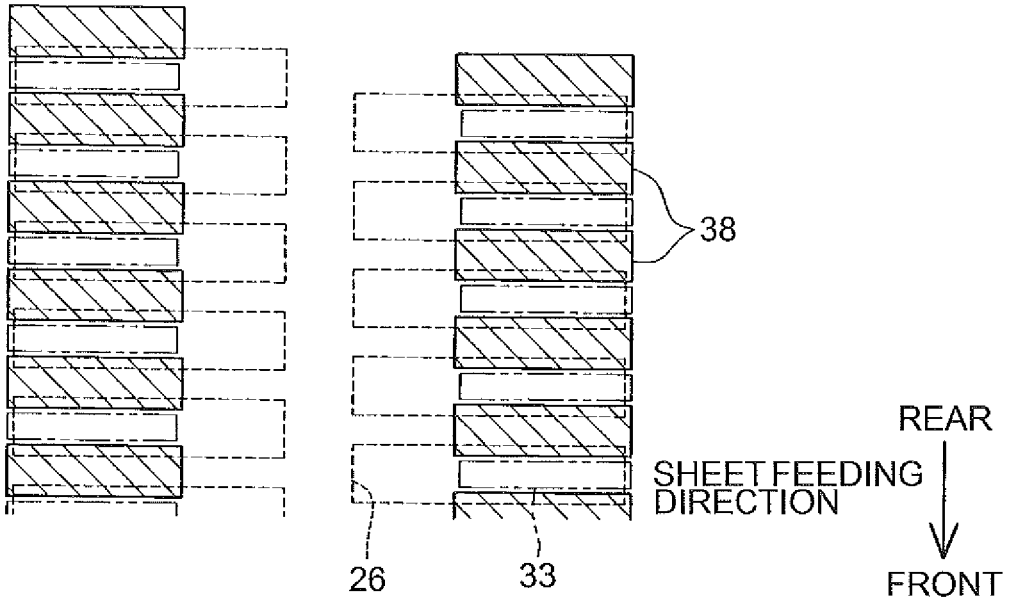
FIG. 6A is a plan view of metal films.
Figure 6B:
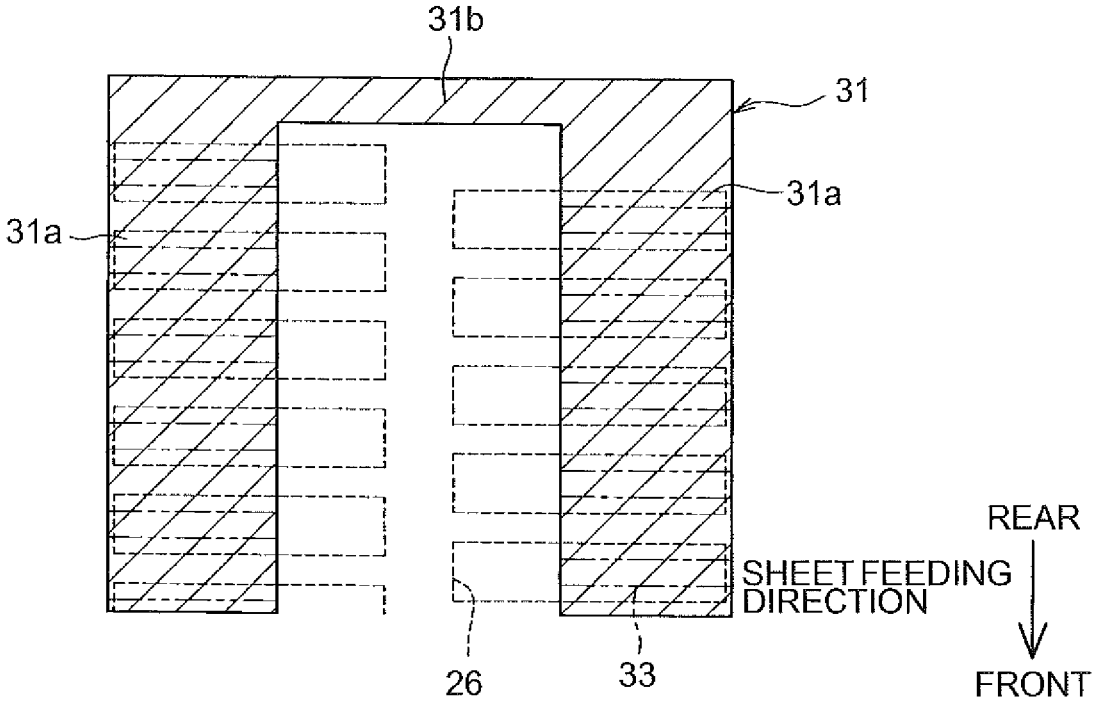
FIG. 6B is a plan view of a lower electrode on the metal films.

To solve such a problem, as illustrated in FIG. 5, the metal film 38 made of a material other than platinum is disposed between the piezoelectric component 32 and the diaphragm 30 of the channel substrate 20 in this embodiment. The lower electrode 31 is stacked on the metal film 38 so as to be in direct contact with the metal film 38. FIG. 6A is a plan view of the metal film 38 and FIG. 6B is a plan view of the lower electrode 31 on the metal film 38. In FIGS. 6A and 6B, the pressure chambers 26 that are positioned below (facing away from the viewer in FIG. 6) the metal film 38 and the lower electrode 31 are indicated by a broken line and the upper electrodes 33 positioned above (facing the viewer in FIG. 6) the metal film 38 and the lower electrode 31 are indicated by a two dotted chain line.

As illustrated in FIG. 6B, the lower electrode 31 includes the two first electrode sections 31a positioned so as to correspond to the two pressure chamber rows and the second electrode section 31b connecting the two first electrode sections 31a. The first electrode sections 31a each extend over the pressure chambers 26 in the corresponding pressure chamber row. The metal films 38 are disposed in non-opposed regions of the first electrode sections 31a of the lower electrode 33, which are defined as being outside the regions opposed to the upper electrodes 33, and are in direct contact with the lower electrode 31. Specifically, as illustrated in FIG. 6A, the metal films 38 are disposed between the upper electrodes 33 arranged in the transport direction, while the lower electrode 31 is disposed over the entire area of each of the metal films 38 so as to be in contact with the metal films 38.

The configuration in which the metal films 38 are in direct contact with the lower electrode 31 enables the lower electrode 31 made of platinum to have a reduced thickness and to have a reduced substantial electrical resistance. The thickness of the lower electrode 31 may be reduced to 0.1 μm or smaller (preferably, 0.05 μm or less), for example. In addition, since the metal films 38 does not face the upper electrodes 33 (piezoelectric portions 37), the deformation of the piezoelectric portions 37 are unlikely to be inhibited by the metal films 38 stacked on the lower electrode 31. In the embodiment, since the entire area of the metal films 38 is in contact with the lower electrode 31, the substantial electrical resistance of the lower electrode 31 is largely reduced.

As illustrated in FIG. 5, the metal film 38 is preferably thicker than the lower electrode 31. The substantial electrical resistance of the lower electrode 31 is largely reduced due to the metal film 38 being thicker than the lower electrode 31. Since the metal film 38 is made of the material other than platinum, the increase in the thickness of the metal film 38 does not increase the cost compared with the increase in the thickness of the lower electrode 31.

As illustrated in FIG. 5, the metal film 38 is preferably positioned outside a region of the lower electrode 31 (defined between dotted chain lines X) in which the diaphragm has the maximum curvature of deformation. In this configuration, the metal film 38 is positioned outside the region in which the diaphragm 30 has the maximum curvature, and thus the metal film 38 is unlikely to inhibit the deflection of the diaphragm 30 due to the deformation of the piezoelectric portion 37.

In the production of the piezoelectric actuator 22, various thermal processes such as annealing of a piezoelectric material film are performed as described above. One reason why the lower electrode 31 is made of platinum is that the metal atoms constituting the lower electrode 31 are unlikely to be dispersed into the piezoelectric portion 37 during a thermal process such as annealing of the piezoelectric portion 37. This is one of the reasons why the lower electrode 31 is made of platinum. However, if the metal film 38 made of the material other than platinum is stacked on the lower electrode 31 made of platinum and the piezoelectric portion 37 is disposed on the metal film 38, the metal constituting the metal film 38 is likely to be dispersed into the piezoelectric portion 37. If the metal of the metal film 38 is dispersed into the piezoelectric portion 37, the piezoelectric portion 37 has different phases, which may cause defects such as electrical breakdown. To prevent such defects, the metal film 38 in the embodiment is disposed adjacent to the channel substrate 20, i.e., on the opposite side of the lower electrode 31 from the piezoelectric portion 37. This configuration reduces the dispersion of the metal of the metal film 38 into the piezoelectric portion 37.

The metal film 38 may be made of any material other than platinum. The metal film 38 is preferably made of a metal material such as copper (Cu) and aluminum (Al) which has a low electric resistivity in view of reduction in the electrical resistance of the lower electrode 31. The metal film 38 is heated together with the piezoelectric portion 37 during the thermal process such as annealing of the piezoelectric portion 37. In view of this, the metal film 38 is preferably made of a metal material such as zirconium, tantalum, and tungsten, which has a high melting point.

Reservoir Defining Member

As illustrated in FIG. 4, the reservoir defining member 23 is disposed on an opposite side (upper side) of the piezoelectric actuator 22 from the channel substrate 20 and is bonded to the upper surface of the piezoelectric actuator 22. The reservoir defining member 23 is made of silicon as the channel substrate 20, for example, but may be made of any material other than the silicon, such as a metal material and a synthetic resin material.

As illustrated in FIG. 4, an upper half portion of the reservoir defining member 23 includes a reservoir 52 extending in the transport direction. The reservoir 52 is connected through tubes, which are not illustrated, to the cartridge holder 7 (see FIG. 1), in which the ink cartridges 17 are mounted.

A lower half portion of the reservoir defining member 23 includes a plurality of ink supply channels 53 extending downward from the reservoirs 52. Each ink supply channel 53 is in communication with the communication hole 30a in the diaphragm 30. This configuration allows the ink to be supplied from the reservoir 52 to the pressure chambers 26 in the channel substrate 20 through the ink supply channels 53 and the communication holes 30a. The lower half portion of the reservoir defining member 23 further includes a protective cover portion 54 covering the piezoelectric elements 39 of the piezoelectric actuator 22. The protective cover portion 54 does not include a wall at an opposite side (right side in FIG. 4) from the ink supply channel 53, and thus a space in which the piezoelectric elements 39 are disposed opens laterally.

Next, steps of producing the inkjet head 4, particularly steps of producing the piezoelectric actuator 22 are described with reference to FIGS. 7A to 7E and FIGS. 8A and 8B. FIGS. 7A to 7E and FIGS. 8A and 8B are views each illustrating a step of producing the inkjet head 4.

FIGS. 7A, 7B, 7C, 7D, and 7E are views illustrating steps of forming the diaphragm 30, the metal film 38, the lower electrode 31, the piezoelectric component 32, and the upper electrode 33, respectively.

Figure 7A:
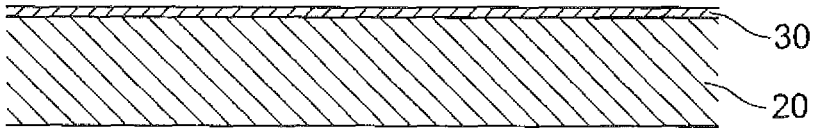
FIGS. 7A to 7E are views illustrating steps of forming a diaphragm, metal films, a lower electrode, a piezoelectric component, and upper electrodes, respectively, as steps of producing the inkjet head.

In the embodiment, a film formation process such as sputtering and a patterning process such as etching are repeatedly performed to sequentially form various films on the diaphragm 30 of the channel substrate 20. As a result, the piezoelectric actuator 22 including the piezoelectric elements 39 is produced. As illustrated in FIG. 7A, the surface of the channel substrate 20 is thermally oxidized, for example, to form the diaphragm 30 formed of silicon dioxide, for example. Then, the diaphragm 30 is etched to form the communication holes 30a.

Figure 7B:
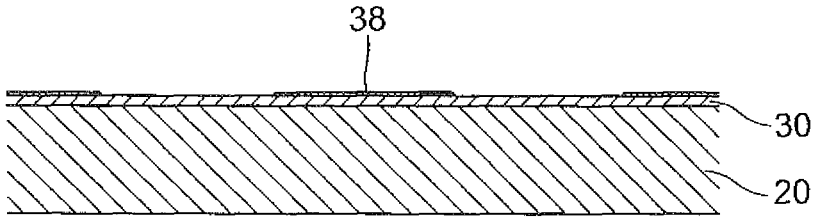
Figure 7C:
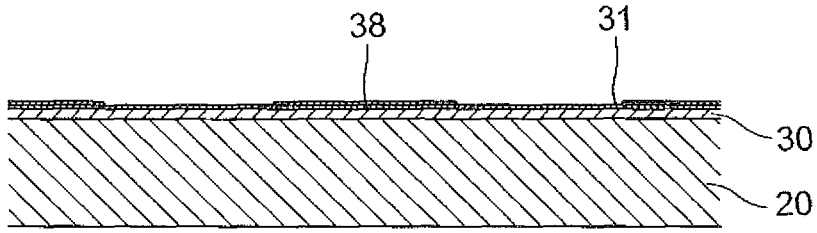

Then, as illustrated in FIG. 7B, the metal films 38 are formed on the diaphragm 30 by using a material other than platinum, such as copper, aluminum, zirconium, tantalum, and tungsten. Specifically, the metal film 38 is formed over the entire upper surface of the diaphragm 30 by sputtering, for example, and then portions of the metal film 38 that is to face the upper electrodes 33 are eliminated by etching. Then, after the metal film formation, as illustrated in FIG. 7C, the lower electrode 31 made of platinum is formed over the metal films 38. Unlike the metal films 38, the lower electrode 31 made of platinum extends over the regions that are to face the upper electrodes 33.

Figure 7D:
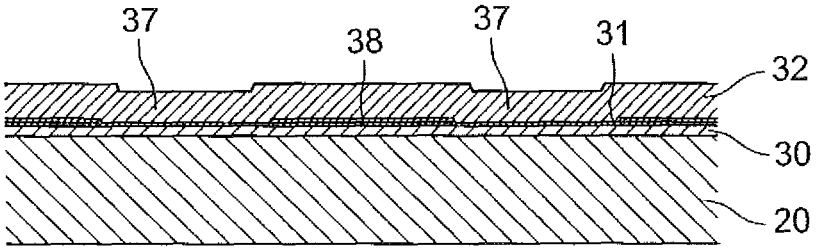
Figure 7E:
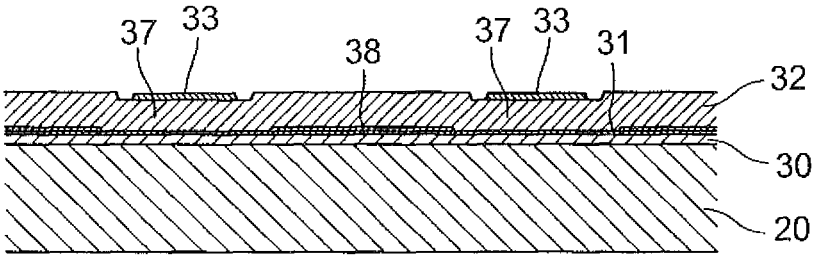

As illustrated in FIG. 7D, a piezoelectric material film is formed on the lower electrode 31 by the sol-gel process or sputtering, and the piezoelectric material film is patterned by dry etching to form the piezoelectric component 32 (piezoelectric portions 37). A thermal treatment for annealing may be suitably performed to form the piezoelectric component 32. Then, as illustrated in FIG. 7E, the upper electrodes 33 made of iridium, for example, are formed on the upper surface of the piezoelectric component 32. The piezoelectric actuator 22 having the piezoelectric elements 39 is produced by the above-described steps.

Figure 8A:
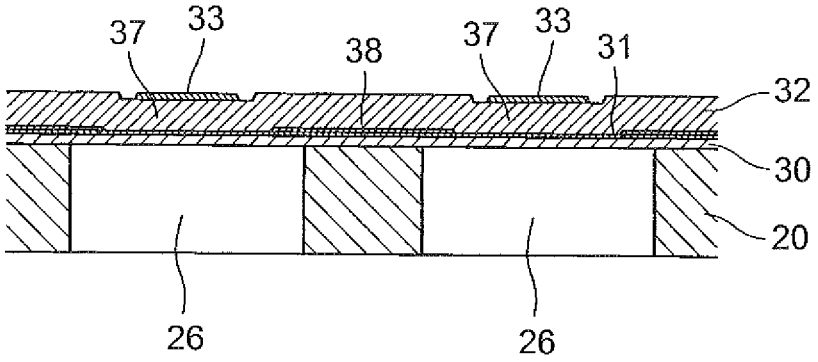
FIGS. 8A and 8B are views illustrating a step of etching a channel substrate and a step of bonding a nozzle plate, respectively, as steps of producing the inkjet head.
Figure 8B:
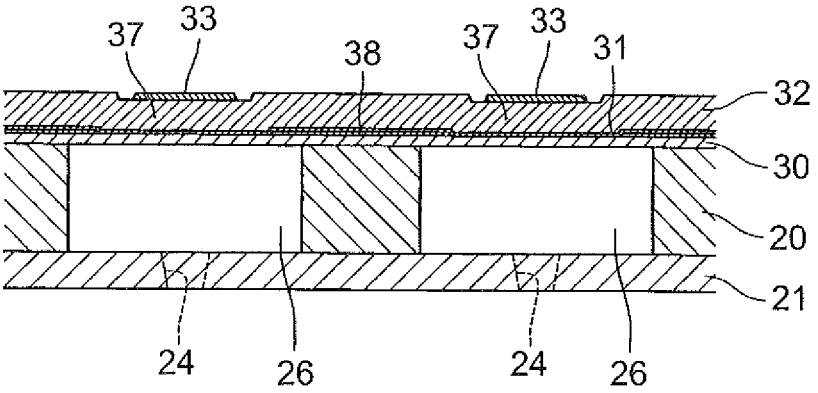

FIG. 8A and FIG. 8B are views illustrating steps of etching the channel substrate 20 and bonding the nozzle plate 21, respectively. As illustrated in FIG. 8A, a lower side of the channel substrate 20 which is an opposite side from the piezoelectric actuator 22 is etched so as to have the pressure chambers 26. As illustrated in FIG. 8B, the nozzle plate 21 is bonded to the lower surface of the channel substrate 20 by an adhesive. Then, the reservoir defining member 23 (see FIG. 4) is bonded to the piezoelectric actuator 22 by an adhesive.

In the above-described embodiment, the inkjet head 4 corresponds to the "liquid ejection apparatus" of the present disclosure. The lower electrode 31 and the upper electrode 33 correspond to the "first electrode" and the "second electrode" in the present disclosure respectively.

Next, various modifications of the above-described embodiment are described. Components in the modifications identical to those in the embodiment are assigned reference numerals the same as those in the embodiment and are not described in detail.

First Modification

Figure 9:
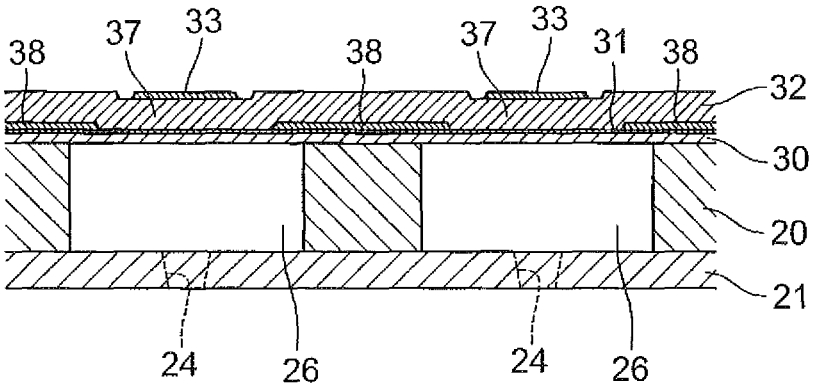
FIG. 9 is a cross-sectional view illustrating a head unit according to a first modification and corresponding to FIG. 5.

In the embodiment illustrated in FIG. 5, the metal films 38 are disposed below the lower electrode 31 (adjacent to the diaphragm 30), but may be disposed above the lower electrode 31 (remote from the diaphragm 30) as illustrated in FIG. 9.

Second Modification

Figure 10:
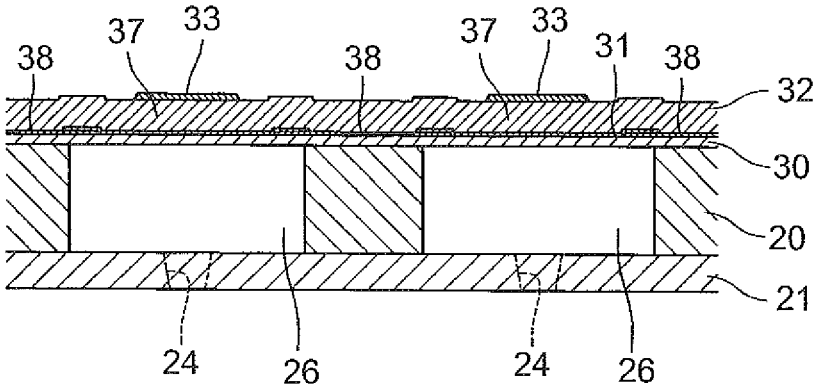
FIG. 10 is a cross-sectional view illustrating a head unit according to a second modification and corresponding to FIG. 5.

In the embodiment, the entire area of each metal film 38 is in direct contact with the lower electrode 31. However, as illustrated in FIG. 10, a part of the metal film 38 may be in contact with the lower electrode 31. This configuration, in which the part of the metal film 38 is in contact with the lower electrode 31 made of platinum, reduces the amount of platinum, which is expensive, and reduces the substantial electrical resistance of the lower electrode 31.

Third Modification

In the embodiment, the metal film 38 stacked on the lower electrode 31 has a thickness greater than that of the lower electrode 31. However, the metal film 38 may have a thickness equal to or smaller than that of the lower electrode 31.

Fourth Modification

In the embodiment, the piezoelectric portions 37 of the piezoelectric elements 39 arranged in a nozzle arrangement direction in which the nozzles are arranged (transport direction) are connected to form one piezoelectric component 32 as illustrated in FIG. 2 and FIG. 3. However, the piezoelectric portions 37 of the piezoelectric elements 39 may separate from each other.

Fifth Modification

In the embodiment, the metal films 38 are separately disposed in non-opposed regions of the lower electrode 31, which are defined as being outside regions opposed to the upper electrodes 33 and positioned between the upper electrodes 33, as illustrated in FIG. 6A. However, the metal films 38 in the non-opposed regions may be connected to each other.

Sixth Modification

In the embodiment, as illustrated in FIG. 6A, the metal films 38 on the lower electrode 31 are disposed in the non-opposed regions, which are defined as being outside the region opposed to the upper electrode 33 and positioned between the upper electrodes 33. However, the metal film 38 is not necessarily disposed in every one of the non-opposed regions. The metal film 38 may be disposed in some of the non-opposed regions.

Seventh Modification

In the piezoelectric actuator 22 in the embodiment, the lower electrode 31 is the common electrode for the piezoelectric elements 39 and each upper electrode 33 is the individual electrode for each of the piezoelectric elements 39. However, the technique in the present disclosure may be applied to an opposite electrode configuration in which the piezoelectric element has the lower electrode as the individual electrode and the upper electrode as the common electrode.

Figure 11:
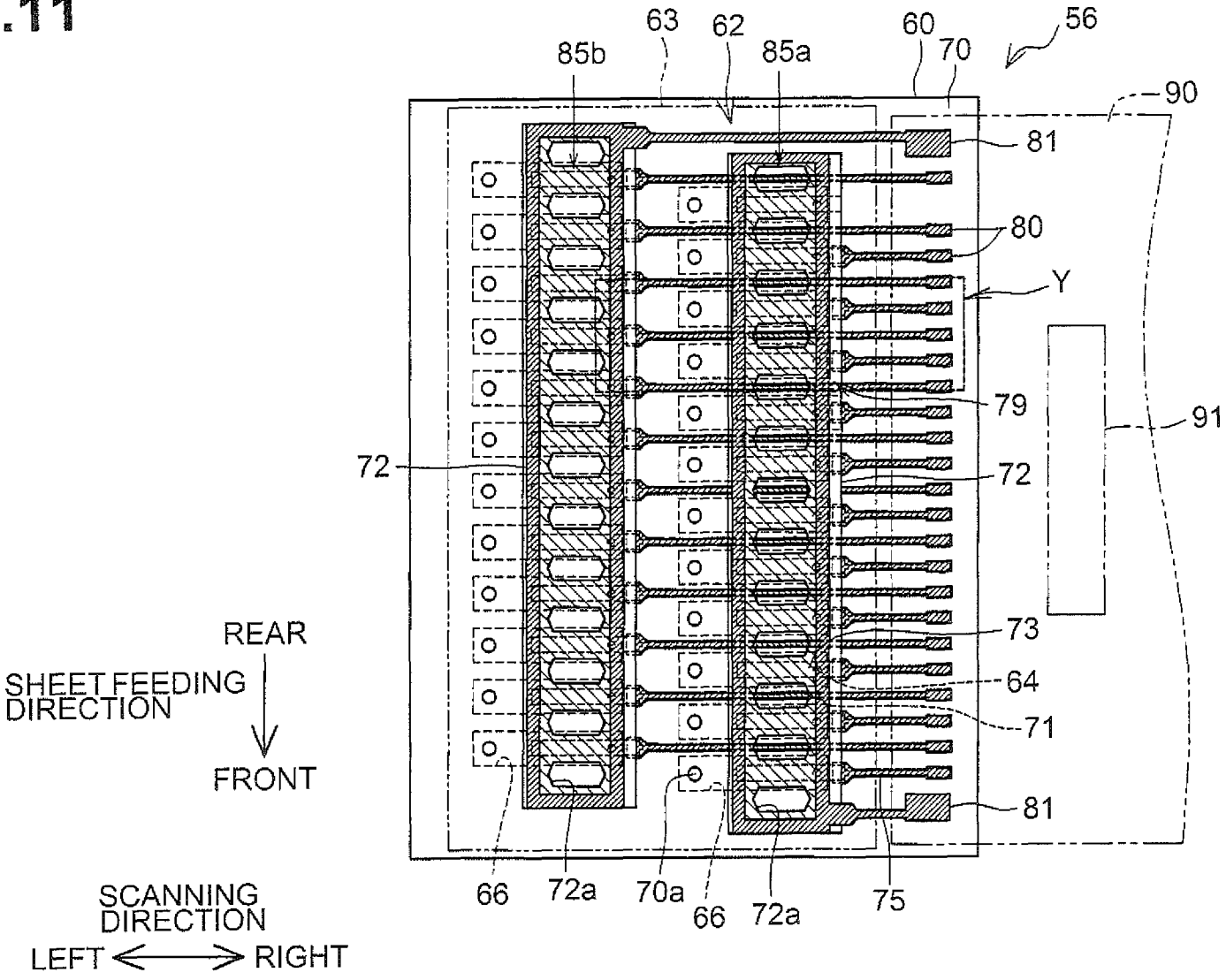
FIG. 11 is a top view illustrating one of head units of an inkjet head according to a seventh modification.
Figure 12:
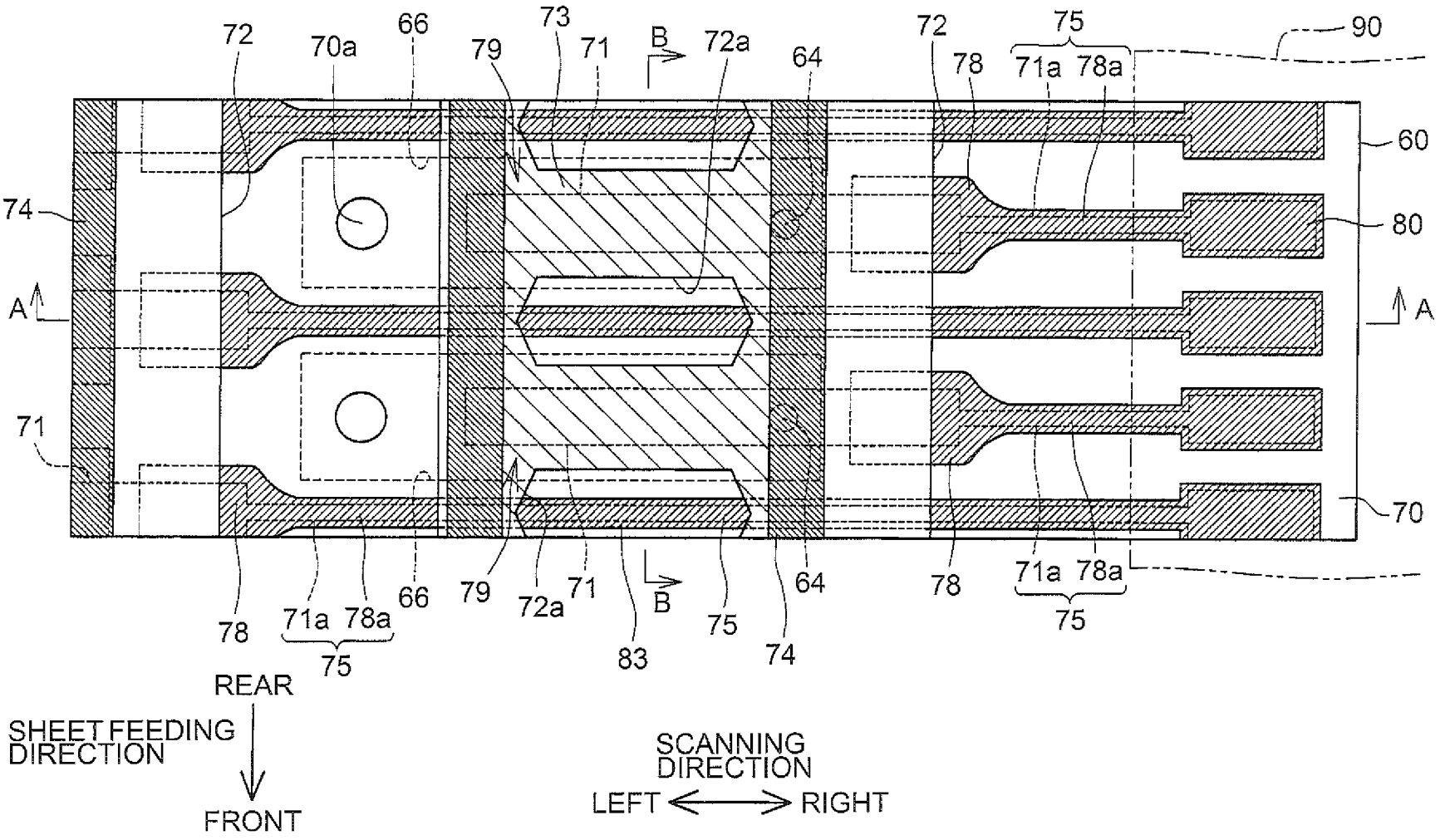
FIG. 12 is a magnified view of a section indicted by Y in FIG. 11.
Figure 13A:
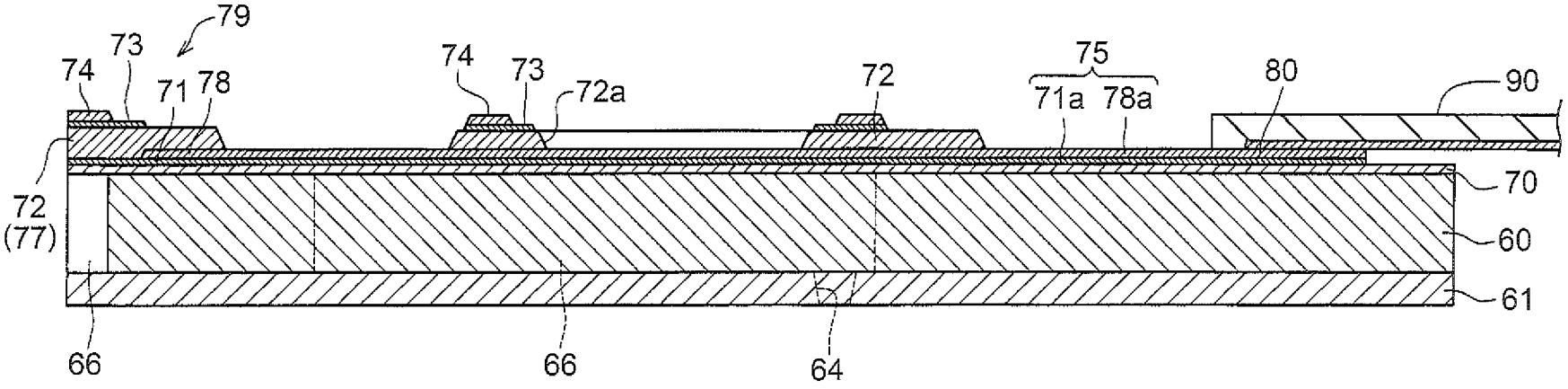
FIG. 13A and FIG. 13B are cross-sectional views taken along a line A-A and a line B-B respectively in FIG. 12.
Figure 13B:
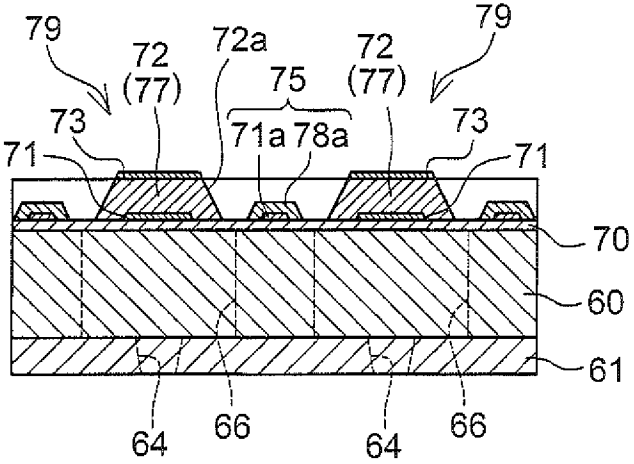

The following is an example of the configuration including lower electrodes as the individual electrodes and an upper electrode as the common electrode. FIG. 11 is a plan view illustrating a head unit 56 of an inkjet head in this modification. FIG. 12 is a magnified view of a section indicated by Y in FIG. 11. FIG. 13A is a cross-sectional view taken along a line A-A in FIG. 12. FIG. 13B is a cross-sectional view taken along a line B-B in FIG. 12.

The head unit 56 includes a channel substrate 60, a nozzle plate 61, a piezoelectric actuator 62, and a reservoir defining member 63. The configurations of the channel substrate 60, the nozzle plate 61, and the reservoir defining member 63 are substantially identical to those disclosed in the embodiment and are not described. Hereinafter, the configuration of the piezoelectric actuator 62 is mainly described.

As illustrated in FIG. 11 and FIG. 12, a plurality of piezoelectric elements 79 are arranged in the transport direction so as to correspond to the pressure chambers 66 (nozzles 64) on a diaphragm 70 of the channel substrate 60. The piezoelectric elements 79 constitute a first and second piezoelectric element rows 85a and 85b are arranged in the scanning direction. A plurality of trace layers 71a connected to the corresponding lower electrodes 71 of the piezoelectric elements 79 is disposed on the diaphragm 70. The lower electrodes 71 and the trace layers 71a are made of platinum. In this modification, every one of the trace layers 71a, which corresponds to the piezoelectric elements 79 arranged in two rows, extends to one side (right side) in the scanning direction. Driving contacts 80 for the trace layers 71a and two ground contacts 81 are disposed on a right end section of an upper surface of the channel substrate 60. A COF 90 on which a driver IC 91 is mounted is connected to the driving contacts 80 and the two grounding contacts 81.

The trace layers 71a corresponding to the piezoelectric elements 79 in the second piezoelectric element row 85b on the left extend between the piezoelectric elements 79 (lower electrodes 71) in the first piezoelectric element row 85a to the right. Portions between adjacent two of the piezoelectric elements 79 (piezoelectric portions 77) of the piezoelectric component 72 extending in the transport direction over the pressure chambers 66 are eliminated by dry etching to form openings 72a. The openings 72a between adjacent two of the piezoelectric elements 79 of the piezoelectric component 72 accelerate the deformation of the piezoelectric portions 77 of the piezoelectric elements 79.

Each lower electrode 71 includes a right end portion including the trace layer 71a. The right end portion does not face the upper electrode 73. The metal film 78 made of a material other than platinum is disposed in the non-opposed regions of the lower electrodes 71. In FIG. 11 to FIG. 13B, the metal film 78 is disposed above the lower electrode 71, but may be disposed below the lower electrode 71. The metal film 78 may be made of any material other than platinum, which is a material of the lower electrode 71. This configuration enables the lower electrode 71 made of platinum to have a smaller thickness, which reduces the cost, and also enables the lower electrode 71 to have a lower substantial electrical resistance, since the metal film 78 made of a material other than platinum is stacked on the lower electrode 71 made of platinum. In this configuration, the metal film 78 is preferably thicker than the lower electrode 71 to reduce the electrical resistance of the lower electrode 71.

In this configuration, each metal film 78 includes trace layers 78a disposed over the trace layers 71a connected to the lower electrodes 71 in addition to the portions disposed over the lower electrodes 71. Each trace layer 78a extends to the driving contact 80 along the trace layer 71a made of platinum. The trace layer 71a made of platinum and the trace layer 78a of the metal film 78 constitutes a trace 75 for each piezoelectric element 79. This configuration reduces the electrical resistance of the traces 75 for the piezoelectric elements 79.

As illustrated in FIG. 12 and FIG. 13B, the trace layers 71a and 78a corresponding to the second piezoelectric row 85b on the left are exposed through the openings 72a of the piezoelectric component 72, which are formed by etching, in the first piezoelectric element row 85a on the right. If the trace 75 is partly scraped away when the piezoelectric component 72 is etched, the trace 75 is made thinner. However, in this modification, the trace 75 includes the trace layer 71a made of platinum and the trace layer 78a made of the metal film 78 stacked on the trace layer 71a. Thus, the trace breakage is unlikely to occur even if the trace 75 is scraped to a certain degree during the formation of the opening 72a by etching (particularly dry etching) the piezoelectric component 72. This improves reliability of electric connection of the trace 75.

Eighth Modification

Figure 14:
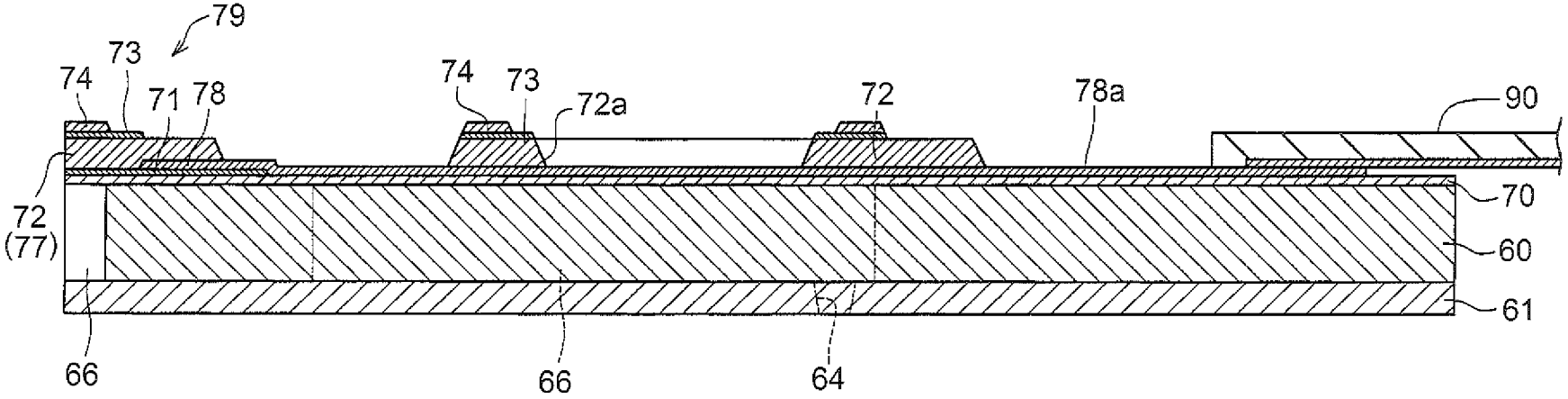
FIG. 14 is a cross-sectional view illustrating a head unit according to an eighth modification and corresponding to FIG. 13A.

In the configuration illustrated in FIG. 13A, the trace layer 71a made of platinum, which is the same material as the lower electrode 71, is disposed below the trace layer 78a of the metal film 78. However, as illustrated in FIG. 14, the trace layer 71a made of platinum is an optional component and the metal film 78 may be disposed only on the lower electrode 71.

In the above-described embodiment and the modifications, the technique in the present disclosure is applied to the piezoelectric actuator of the inkjet head, which ejects ink to the recording medium to print an image, for example. However, the technique in the present disclosure may be applied to any liquid ejection apparatus that is used for any different usages than the printing of the image. The technique in the present disclosure may be applied to a liquid ejection apparatus that ejects a conductive liquid to a board to form a conductive pattern on the substrate, for example.

What is claimed is:

1. A liquid ejection apparatus comprising:

a pressure chamber;

a diaphragm covering the pressure chamber;

*a metal film disposed onto the diaphragm;* a piezoelectric element having a piezoelectric component positioned opposing the pressure chamber;

a first electrode disposed on a first side of the piezoelectric component [toward the pressure chamber], *the first electrode being disposed over at least a portion of the metal film*;

a second electrode disposed on a second side of the piezoelectric component opposite *to* the first side in an opposed region, the opposed region being a region opposed to the second electrode, *the second side being opposite to the pressure chamber with respect to the first side*; and

[a] *wherein the* metal film [being] *is* absent from at least a portion of the opposed region;

wherein a portion of the metal film and a portion of the first electrode are in electrical contact with each other, wherein the portion of the metal film and the portion of the first electrode are between the piezoelectric component and the diaphragm, *and* wherein the piezoelectric component covers the portion of the metal film and the portion of the first electrode,

[wherein the first electrode is made of platinum and the metal film is made of a metal material other than platinum].

2. The liquid ejection apparatus according to claim 1, wherein the metal film is disposed in a non-opposed region, the non-opposed region being outside of the opposed region.

3. The liquid ejection apparatus according to claim 1, wherein the metal film is absent from the opposed region.

4. The liquid ejection apparatus according to claim 1, wherein the metal film is thicker than the first electrode.

5. The liquid ejection apparatus according to claim 1, wherein the portion of the metal film is disposed closer to the diaphragm than the first electrode is disposed to the diaphragm.

6. The liquid ejection apparatus according to claim 1, wherein the metal film is disposed outside a region in which the diaphragm has maximum curvature of deformation.

7. The liquid ejection apparatus according to claim 1, wherein the metal film constitutes a portion of a trace connected to the first electrode.

8. The liquid ejection apparatus according to claim 1, wherein an entire surface of the metal film on a side opposite from the diaphragm is in direct contact with the first electrode.

9. The liquid ejection apparatus according to claim 1, wherein the metal film is made of one of copper and aluminum.

10. The liquid ejection apparatus according to claim 1, wherein the metal film is made of any one of zirconium, tantalum, and tungsten.

11. The liquid ejection apparatus according to claim 1, wherein the first electrode has a thickness of 0.1 μm or less.

12. The liquid ejection apparatus according to claim 1, further comprising:

a plurality of pressure chambers, each pressure chamber covered by the diaphragm; and a plurality of piezoelectric elements.

13. The liquid ejection apparatus according to claim 12, wherein the plurality of piezoelectric elements form a first piezoelectric element row and a second piezoelectric element row, the first and second piezoelectric element rows each extending in a first direction and spaced apart from each other in a second direction perpendicular to the first direction; and wherein the piezoelectric element is included in the second piezoelectric element row;

the liquid ejection apparatus further including a trace electrically connected to the metal film, the trace extending between adjacent piezoelectric elements of the plurality of piezoelectric elements in the first row, the trace at least partially exposed between the adjacent piezoelectric elements.

14. The liquid ejection apparatus according to claim 1, further comprising a nozzle in fluid communication with the pressure chamber.

*15. The liquid ejection apparatus according to claim 1, wherein the first electrode is made of platinum and the metal film is made of metal material other than platinum.*

* * * * *